Figure 3:
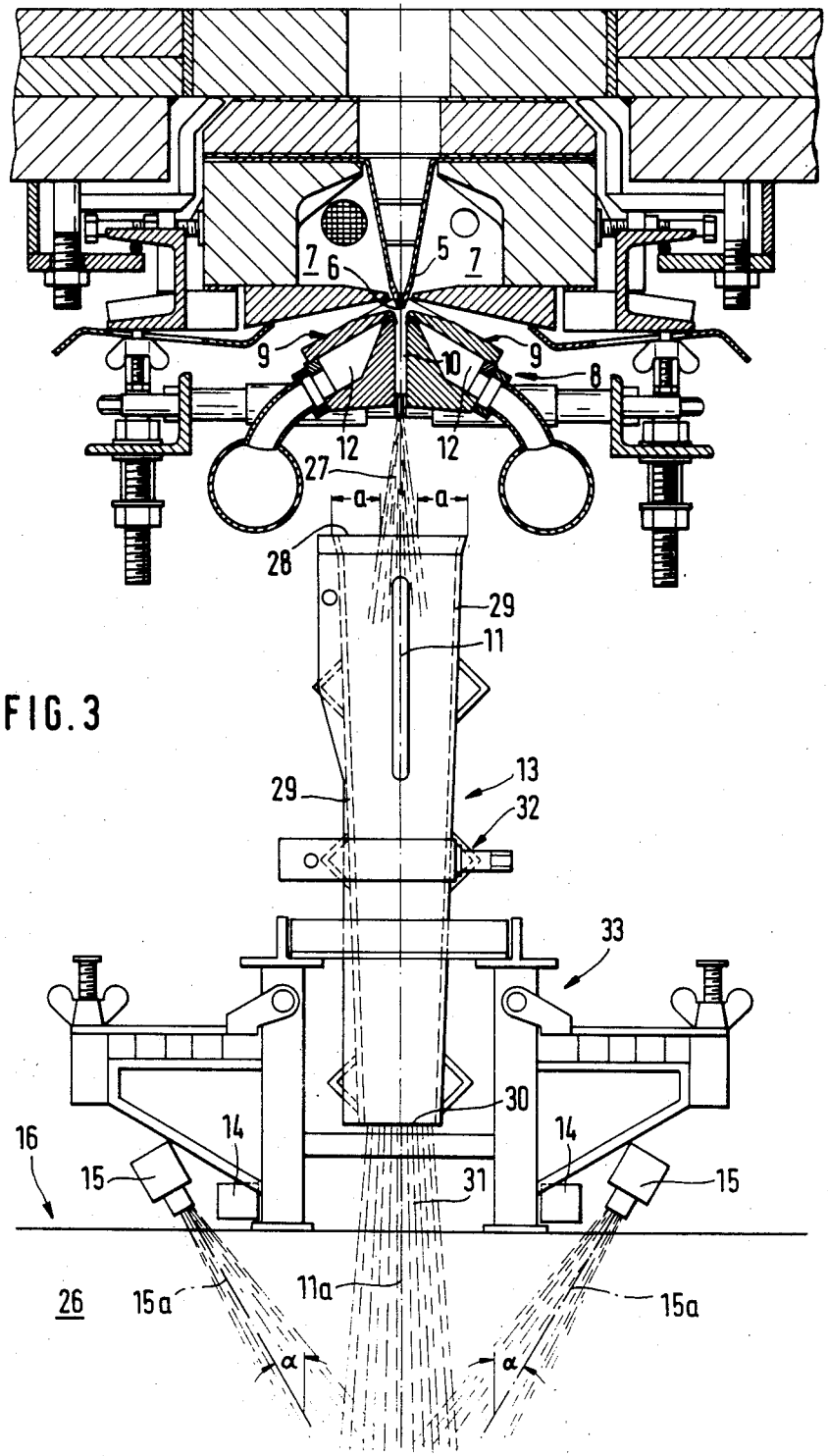

United States Patent [19]

Fachat et al.

[11] Patent Number: 4,822,392
[45] Date of Patent: Apr. 18, 1989

[54] APPARATUS FOR PRODUCING FIBRES FROM SILICATE RAW MATERIALS SUCH AS BASALT BY BLAST DRAWING

[75] Inventors: Gaston Fachat, Ladenburg; Klaus Sistermann, Neustadt; Heinz-Jürgen Ungerer, Viernheim, all of Fed. Rep. of Germany

[73] Assignee: Grunsweig & Hartmann and Glasfaser AG, Fed. Rep. of Germany

[21] Appl. No.: 111,125

[22] Filed: Oct. 22, 1987

Related U.S. Application Data

[63] Continuation of Ser. No. 840,751, Mar. 13, 1986, abandoned.

[30] Foreign Application Priority Data

Mar. 15, 1985 [DE] Fed. Rep. of Germany ....... 3509424

[51] Int. Cl.$^4$ .................. C03B 37/06; C03C 25/02
[52] U.S. Cl. ........................ 65/16; 65/3.43;
   65/9; 65/11.1; 156/62.4
[58] Field of Search .............. 65/3.43, 4.4, 7, 8,
   65/9, 11.1, 12; 156/62.4

[56] References Cited

U.S. PATENT DOCUMENTS

| 2,230,270 | 2/1941 | Simpson | 65/9 |
| 3,819,441 | 6/1974 | Fargo et al. | 65/4.4 X |
| 3,877,911 | 4/1975 | Burst | 65/3.43 |
| 4,168,959 | 9/1979 | Loeffler | 65/... |

FOREIGN PATENT DOCUMENTS 1031448 6/1953 France .................... 65/4.4

Primary Examiner—Robert L. Lindsay
Attorney, Agent, or Firm—Finnegan, Henderson, Farabow, Garrett & Dunner

[57] ABSTRACT

Apparatus for producing mineral fibres from silicate raw materials such as basalt by blast drawing.

When blast drawing is used to produce mineral fibres from basalt, there is arranged between the entry zone (26) of the chute (16) and the exit zone of the nozzle slot (10) of the blast nozzle unit (8), this slot forming the fiberization duct, a guide cell (13). The relative position of the side walls (29) of the guide cell is freely adjustable, so that desired flow conditions can be set and also the exit direction of the exit flow bundle (31) and hence the web formation can be controlled. As a consequence of a lateral distance (a) of the exit orifice (28) of the guide cell (13) relative to the entry flow bundle (27) additional secondary air is sucked in, which has a further cooling effect on the fibres. At the exit orifice (30) from the guide cell (13) the flow is restructured and emerges as a cooled exit flow bundle (31) and is at that point initially subjected to a further cooling with cooling water applied by spray nozzles (14) and by further secondary air sucked into this zone before the application of binder from spray nozzles (15). The spray axis (15a) of the spray nozzles (15) forms an acute angle ($\alpha$) with the axis (11a) of the exit flow bundle (31) in order to ensure homogeneous incorporation of binder into the flow bundle (31).

9 Claims, 2 Drawing Sheets

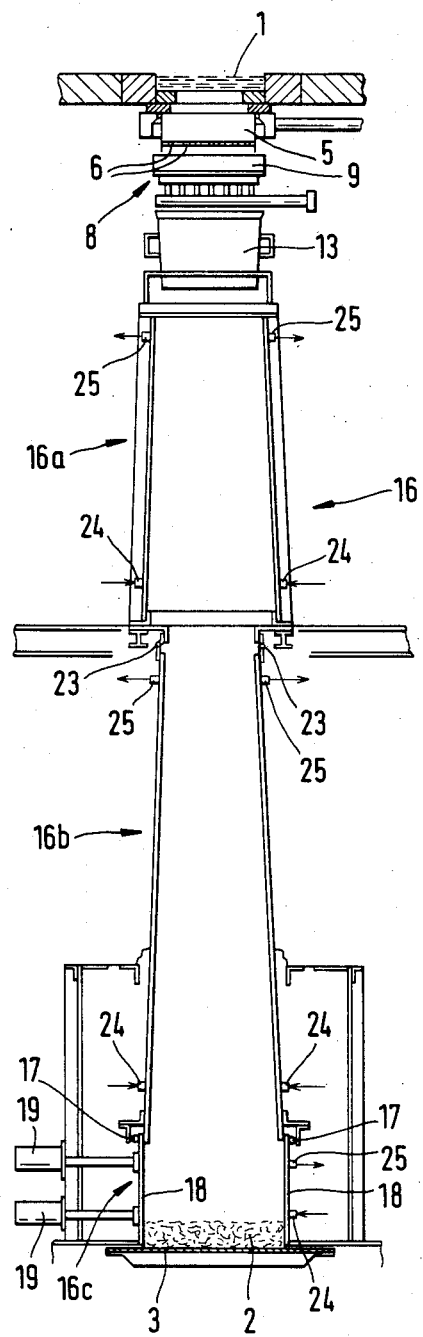
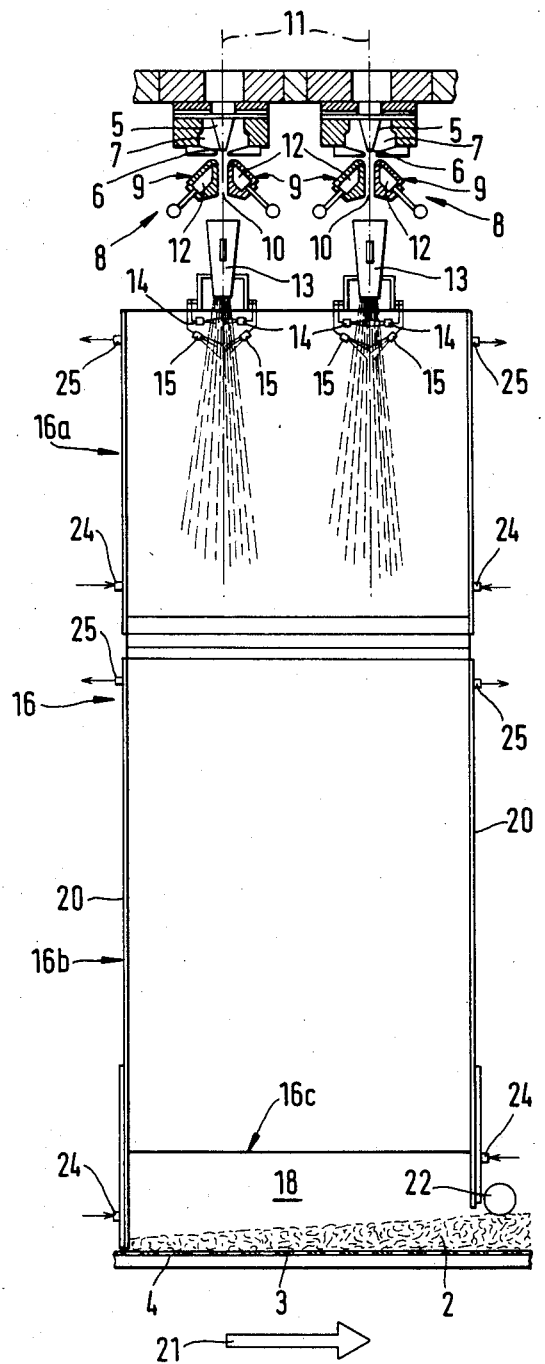

APPARATUS FOR PRODUCING FIBRES FROM SILICATE RAW MATERIALS SUCH AS BASALT BY BLAST DRAWING

This application is a continuation of application Ser. No. 840,751, filed Mar. 13, 1986 now abandoned.

The invention relates to apparatus for producing mineral fibres from silicate raw materials such as basalt by blast drawing.

The mineral fibres produced by blast drawing in the blast nozzle unit customarily pass from the fiberisation duct or nozzle slot of the blast nozzle unit into a chute in which the fibres emerging from the fiberisation units occupy a wider cross-section with increasingly uniform distribution and are finally laid onto a conveyor belt to form a web. In the entry zone of the chute the fibres are customarily sprayed with a binder such as phenolic resin if bonded fibres are to be produced. The amount of binder sprayed in depends on the intended use of the mineral fibres and is considerably higher, for example, for manufacturing compact boards of high bulk density than for producing, for example, a loose felt of low bulk density.

When the binder is applied, the freshly generated fibres need to have cooled down sufficiently as to avoid premature curing of the binder as a consequence of excessive heating up on the fibres. For that reason, the binder must not be sprayed in at a point less than a certain distance below the exit side of the fiberisation unit. However, the flow bundle of fibre emerging from the fiberisation unit already has comparatively large cross-section, so that homogeneous incorporation of the binder from the outsides of the flow bundle is difficult.

Nor do the fiberisation unit, which need to be wholly orientated towards the very complex process of fiberisation, offer in practice any way of adjusting the orientation of the exit flow of the fibres in the sense of a desirable effect on the formation of the mineral fibre web. It is true that the walls of the chute can be constructed as so-called vibrating walls and be arranged to be adjustable, but these walls would merely affect the edge zones of the flow in the sense of an adjustable limitation of, for example, the edge of the mineral fibre web, while it is virtually impossible to use these means to affect the distribution of the fibres across the width of the mineral fibre web. However, that would be desirable, since the evacuation beneath the conveyor belt can have the effect of generating variable and unclear flow conditions in the chute which lead to irregular laying of the fibre if no special facilities for affecting the process are present.

Finally, a relatively large free distance between the exit side of the fiberisation units and the entry zone of the chute, as is unavoidable if only for constructional reasons, leads to unclear flow conditions at the exit side of the fiberisation units. As a result, there can be local backflows which act back into the exit of the fiberisation duct where they cause pressure surges. These flow problems lead to the increased formation of so-called beads, that is to say melt residues which are not drawn into the shape of fibres and which are extremely undesirable in the product. This danger of increased bead formation is particularly high when the operation is carried out using a wide fiberisation duct and relatively low flow velocities and the purpose is to produce relatively thick fibres having diameters of above 10 um, which cool down relatively slowly and therefore, given mutual contact in the course of say loop formation, are still very prone to bead formation even in the exit zone of the fiberisation duct.

In the case of such relatively thick fibres, the above-mentioned problem of rapid cooling before binder application is also particularly serious, since the dissipation of heat from the interior of the fibre takes a correspondingly long time in the absence of special additional measures.

It is the object of the invention to provide an apparatus and which permits backflow-free guidance of the flow, from the exit side of the fiberisation unit into the entry zone of the chute.

The effect of positioning between the entry zone of the chute and the exit side of the blast nozzle unit, i.e. the exit side of the fiberisation unit, a guide cell which has a cross-section which converges in the downward direction and the entry orifice of which overlaps with the flow bundle emerging from the blast nozzle unit with space at the side is to give fresh direction and alignment to the flow at the exit from the blast nozzle unit, the injector action of the space between the outside of the flow bundle and the entry portion of the guide cell having the effect of attracting further secondary air from the environment. This secondary air serves for the controlled further cooling of the fibres in the guide cell and for obtaining an orientated flow between the entry zone of the guide cell and the exit side of the blast nozzle unit, so that backflows are reliably avoided there. At the nozzlelike exit cross-section of the guide cell, the flow re-emerges in an exit flow bundle in which the entrained fibres have cooled down to a sufficient extent even if of appreciable thickness. This exit flow bundle is then availble for controlled treatment with sprayed-in binder or other heat-sensitive substances.

If the relative angular position of the side walls of the guide cell is arranged to be adjustable, it is easily possible to carry out precision adjustments of the intake conditions for the secondary air on the one hand and of the exit flow conditions or a desired higher flow velocity on the other. It is preferable if, at least, the cross-section of the lower exit orifice of the guide cell is likewise adjustable, so that the emerging gas and fibre jet can be spread out to a greater or lesser extent, in accordance with requirements. In addition to such fundamentally symmetrical adjusting measures it is also possible for the side walls to be adjustable in various angles relative to the extension of the plumb line of the primary jets, so that the emerging fibre jet can be adjusted in respect of the direction of its flightpath and this method can be used for exerting controlled influence on the deposition of fibre onto the conveyor belt.

The arrangement of spray nozzles within the area of the exit orifice of the guide cell makes it possible to spray fluent media in a controlled manner into the exit flow bundle emerging there. This method can be used to spray in cooling liquid in order to make possible fast additional cooling of the fibres. It is additionally or alternatively possible to spray in a binder, the binder being sprayed in an oblique downward direction, so that the fluent binder can penetrate deeply and homogeneously and without reflection phenomena into the diverging flow bundle at a distant point from the water application point. The formation of a new exit flow bundle at the exit side of the guide cell into the entry zone of the chute results in a further injector action and thus attraction of additional secondary air into this zone, this air flowing around the spray nozzles from their rear side and thus keeping them clean. At the same time the secondary air flow favours the incorporation of the sprayed media into the flow bundle. An additional effect of the introduction of further secondary air is further additional cooling, so that there is no danger of premature curing of the binder even in the case of thick fibres.

Further details, features and advantages of the invention will be apparent from the following description of an embodiment by reference to the drawing, in which FIG. 1 shows an apparatus according to the invention in a schematic front view, FIG. 2 shows the apparatus of FIG. 1 in a side view and FIG. 3 shows the upper zone of the apparatus of FIGS. 1 and 2 in magnified form together with constructional details in a side view corresponding to the drawing in FIG. 2.

As FIGS. 1 and 2 show, an apparatus according to the invention serves for converting a mineral melt, signified by 1, in the top part of the apparatus into mineral fibres which are deposited onto a conveyor belt 3 for the formation of a continuous mineral fibre web 2 which is transported away, in the drawing of FIG. 2 towards the right-hand side. As indicated in FIG. 2, the conveyor belt 3 has perforations 4 through which air or gas can be sucked downward as is customary per se in the production of mineral fibres, in an unspecified manner.

The melt 1 from a melt tank (not depicted) is fed in this illustrative case to two adjacent distributor tanks 5 which each have a number of exit orifices 6 for melt. The distributon tanks 5 are made of platinum in conventional and known manner and are maintained at a desired temperature by means of flames in lateral hollow spaces 7.

As is in principle likewise customary with blast drawing, there are arranged beneath the exit orifices 6 blast nozzle means 8 which each consist of two blast nozzle halves 9 and, arranged therebetween, a nozzle slot 10 through which primary filaments of melt emerging from the exit orifices 6 appear in correspondence with the plumb lines 11 shown in FIG. 2 and are simultaneously fiberised by means of propellant gas which is provided under superatmospheric pressure in hollow spaces 12 of the blast nozzle halves 9 and is blown into the nozzle slot 10 by way of blow-in slits not visible in FIGS. 1 and 2. The basic processes which take place in this process of fiberisation are familiar to the person skilled in the art.

The—as drawn—lower exit side of the blast nozzle means 8 sees the emergence of a flow bundle 27 (cf. FIG. 3) which contains the propellant gas; secondary air attracted from the upper side of the blast nozzle unit 8 by the injector action of the blown-in propellant gas; together with combusting off gases from the hollow spaces 7 and the freshly formed fibres at still high temperatures. The flow bundle 27 arrives in the guide cells 13 which are convergent in nozzlelike fashion, as a result of which further secondary air is attracted once more on their upper side for further cooling, and the resulting fibre-gas mixture emerges from the exit of the guide cells 13 with renewed bundling into a flow bundle 31 again. Owing to the elongated shape of the nozzle slots 10 and guide cells 13, the flow bundles 27 and 31 are naturally of a corresponding elongated shape and merely act as slender circular cones in a view corresponding to FIG. 2 or 3. In the region of the lower end of the guide cells 13 there are spray nozzles 14 for injecting cooling liquid such as cooling water and spray nozzles 15 for injecting binder such as phenolic resin in fluent consistency.

That is also the entry zone of a chute which is signified as a whole by 16 and which has, arranged on top of one another, a first chute section 16a, a second chute section 16b and a third chute section 16c. In the interior of the chute 16 the descending fibres cool down further and become distributed across the cross-section of the chute, so that the result is uniform deposition as a web 2 on conveyor belt 3, and the entrained gases carried over into the chute 16 are evacuated away in the known manner already indicated above.

The lower chute section 16c of chute 16 has movable side walls 18 which are for example adjustable in their position through parallel shifting by way of adjusting members 19 and are connected to the adjoining walls of the middle chute section 16b by means of catches 17 and, as is clear from FIG. 1, bound the side edges of the web. As is clear in the drawing from the cut-away representation of the area of the chute 16, the front walls 20 of the middle chute section 16b extend into the area of the lower chute section 16c and thus also form the front walls of that section as well. The front walls 20 of the entire chute 16 are arranged to be rigid, and the front wall which is to the rear in relation to arrow 21 which indicates the transport direction is correspondingly shorter to accommodate the height of the mineral fibre web 2, so that the mineral fibre web 2 can emerge from the area of the chute 16, and during emergence is simultaneously subject to the application of pressure and height levelling by a likewise cooled roll 22.

It is true that in this way some of the circumferential walls of the chute 16 are movable, like for example the side walls 18 of the lowest chute section 16c through parallel shifting and if required likewise the side walls of the middle chute section 16b through pivoting movement about hinges 23, but all the circumferential walls as such are constructed to be rigid, that is to say have no possible movement for continuous self-cleaning or the like. On the other hand, however, all the circumferential walls of the chute 16 are constructed to be jacketed, the resulting hollow spaces being filled with cooling liquid which in each case is suppliable through connections 24 and dischargeable through connections 25.

As to further details, features and advantages of the blast nozzle means 8 and the fiberisation therein and of the construction of the chute 16, express reference is made to the full content of the two parallel German patent applications of the same applicant and of the same date entitled "Apparatus for producing mineral fibres from silicate raw materials, in particular basalt having a modular modulus of viscosity of at least 1.4, by blast drawing" and "Apparatus for producing mineral fibres from silicate raw materials such as basalt, in particular by blast drawing", West German Pat. No. 3309426 (U.S. Pat. No. 4,698,085) and West German Pat. No. 3509426, (U.S. Pat. No. 4,698,086) respectively.

In FIG. 3, the upper area of the representation as per FIGS. 1 and 2 is shown magnified and with constructional details from the entry zone, signified by 26, of the chute 16. As this magnified representation shows more clearly, the nozzle slot 10 which forms the fiberisation duct of the blast nozzle unit 8 spews out a flow bundle 27 which, after a short free passage of for example about 6 cm, enters into the entry orifice, signified by 28, of the guide cell 13. The entry orifice 28 of the guide cell 13 has a much larger cross-section compared with the entry cross-section of the flow bundle 27, so that a lateral distance a remains essentially symmetrical on both sides of the entry flow bundle 27 and forms a passage through which secondary air is attracted by injector action from the area below the blast nozzle unit 8. For a given angular position of the side walls 29 of the elongated guide cell 13, the bilateral distance a is a measure of the amount of secondary air additionally attracted through the entry orifice 28.

At the lower exit orifice 30 the medium consisting of the entry flow bundle 27 and the attracted secondary air re-emerges bundled and newly structureo in the form of an exit flow bundle 31. In the middle area of the guide cell 13, which is for example about 30 cm long, there is arranged a control handle 32 by means of which the relative angular position of the side walls 29 is freely adjustable, so that the cross-sectional area of the exit orifice 30 can be varied, and additionally the degree of taper of the guide cell 13 can likewise be adjusted. In addition, the slope of the two side walls 29 can be set to be different, so that the result is a certain deviation from the symmetry relative to the extended plumb line 11 of the primary filaments and hence a controlled effect on the direction of the exit flow bundle.

In the guide cell 13 the fibres cool down, first of all as a result of the residence time therein, supported by the secondary air introduced in a controlled manner and in a desired amount at the entry orifice 28 and the 5 adiabatic pressure drop as a consequence of the accelerated flow in the guide cell 13. The fibres emerging in the exit flow bundle 31 are as a result already well precooled, but they first of all pass into the area of the spray nozzles 14 for cooling liquid such as cooling water, which is sprayed in a veil transversely to the direction of flow of the flow bundle 31 immediately after the exit from the exit orifice 30. A further set of spray nozzles 15 distributed at the circumference of the exit flow bundle 31 but of course at a distance therefrom serves for injecting binder in fluent consistency, for example phenolic resin. The spray nozzles 15 are inclined obliquely downward relative to the exit axis 11a of the exit flow bundle 31 in such a way that the spray axes 15a of the spray nozzles 15 form an angle α with the axis of the flow bundle 31 which is for example about 20°. As a result the binder arrives on the fibres at a considerable vertical distance from the cooling liquid coming out of spray nozzles 14, so that the cooling liquid can ensure further drastic cooling before the binder is applied. It has also been found that an angle α within the range between about 10° and 45° to the axis 11a of the exit flow bundle 31 makes possible clean and homogeneous penetration of the sprayed jets of binder into the flow bundle 31 and that even the middle portion of the flow bundle 31 is uniformly wetted also. That is of critical importance for the quality of the resulting product in particular whenever the amount of binder used is only relatively low, such as, for example, for the production of inserts for exhaust silencers, for which thick long fibres from the blast nozzle unit 8 are used.

The entry of the accelerated and restructured exit flow bundle 31 into the entry zone 26 of the chute 16 has a further injector action with which secondary air is attracted from the environment of a support frame 33, by means of which the guide cell 13 is fixed to the upper side of the chute 16. As a result secondary air flows in at least roughly approximately parallel to the spray axis 15a of the spray nozzles 15, so that the secondary air additionally supports the introduction of the binder into the exit flow bundle 31. The flow of clean air from the rear side of the spray nozzles 14 and 15 also ensures their automatic cleaning. Finally, this further secondary air has again an additional cooling action on the fibres in the exit flow bundle 31 in order in this way additionally to counteract premature curing of the binder. The additional amounts of air can be adjusted at the upper side of the guide cell 13 and the upper side of the chute 16 by corresponding apportioning measures in such a way that it is possible to avoid an amount of air which is excessively large in view of the evacuation in the area of the conveyor belt 3. This is also avoided by very substantially avoiding the entry of unwanted air into the area of the chute 16, as is explained in detail in the previously mentioned German patent 3509425. (U.S. Pat. No. 4,698,086). It is consequently ensured that in the area of the conveyor belt 3 the only air which needs to be evacuated is that which previously made a positive contribution to the course of the process.

The representation in FIG. 3 shows further constructional details which speak for themselves and is otherwise to scale, so that by means of the indicated dimensions it is possible to make inferences directly from this representation to dimensinns which have not been explained in detail but which may likewise be significant for optimum performance.

We claim:

1. Apparatus for producing fibres by blast drawing, comprising:
    (a) a melting tank and at least one distributor tank fed therefrom, said distributor tank having exit orifices for passing primary filaments of melt to a blast nozzle unit;
    (b) a blast nozzle unit arranged underneath said exit orifices at a distance therefrom and symmetrical relative to the plumb line of the primary filaments and having an exit side;
    (c) a chute arranged underneath said blast nozzle unit and having an entry zone;
    (d) at least one guide cell positioned between the exit side of said blast nozzle unit and the entry zone of said chute, said guide cell having an upper entry orifice for receiving a flow bundle from said blast nozzle unit, a lower exit orifice for discharging the flow bundle therefrom and a downwardly converging passageway connecting said orifices; said upper entry orifice having a cross-section larger than the cross-section of said flow bundle from said blast nozzle unit to provide a lateral distance therebetween; and
    (e) a conveyor belt arranged at the lower end of said chute and on which the mineral fibres produced are laid and transported away in the form of a continuous web.

2. The apparatus of claim 1, wherein the relative angular position of the side walls of said guide cell is adjustable.

3. The apparatus of claim 2, wherein the cross-sectional area of said lower exit orifice of the guide cell is adjustable.

4. The apparatus of claim 3, wherein said side walls are adjustable in varying angles relative to the extended plumb line of said primary filaments.

5. The apparatus of claim 2, wherein said side walls are adjustable in varying angles relative to the extended plumb line of said primary filaments.

6. The apparatus of claims 1, 2, 3, 4, or 5, wherein in the area of said exit orifice outside the circumferential area of said flow bundle emerging therefrom there are arranged spray nozzles.

7. The apparatus of claim 6, wherein at least a portion of said spray nozzles is connectable to a supply means for either or both cooling liquid and fluent binder.

8. The apparatus of claim 7, wherein the spray axis of said spray nozzles forms an angle of between 10° and 45° with the axis of said flow bundle and the spray axes of said spray nozzles are arranged to point obliquely downward.

9. The apparatus of claim 1, wherein said downwardly converging passageway is vertically aligned with the plumb line of the flow bundle from said blast nozzle unit and has a continuous, downwardly converging cross-section.

* * * * *